US012375851B2

(12) United States Patent
Yu

(10) Patent No.: US 12,375,851 B2
(45) Date of Patent: Jul. 29, 2025

(54) MEETING SPEAKER BOX FOR A MOBILE TERMINAL

(71) Applicant: Luxsan Technology (Kunshan) Co., Ltd., Jiangsu (CN)

(72) Inventor: Chai-Te Yu, Taiwan (CN)

(73) Assignee: Luxsan Technology (Kunshan) Co., Ltd., Jiangsu (CN)

( * ) Notice: Subject to any disclaimer, the term of this patent is extended or adjusted under 35 U.S.C. 154(b) by 264 days.

(21) Appl. No.: 18/182,021

(22) Filed: Mar. 10, 2023

(65) Prior Publication Data

US 2024/0048909 A1 Feb. 8, 2024

(30) Foreign Application Priority Data

Aug. 5, 2022 (CN) .......................... 202210936339.7

(51) Int. Cl.
*H04R 1/02* (2006.01)
*H04R 1/04* (2006.01)
(Continued)

(52) U.S. Cl.
CPC .............. *H04R 3/12* (2013.01); *H04R 1/028* (2013.01); *H04R 1/04* (2013.01); *H04R 1/28* (2013.01);
(Continued)

(58) Field of Classification Search
CPC ........ H04R 29/001; H04R 1/028; H04R 3/12; H04R 1/323; H04R 1/04; H04R 3/005;
(Continued)

(56) References Cited

U.S. PATENT DOCUMENTS 10,571,976 B2 * 2/2020 Sharma ................. G06F 1/1616
11,561,575 B2 * 1/2023 Perelli ................... G06F 1/1647
(Continued)

FOREIGN PATENT DOCUMENTS

CN 1582061 A 2/2005
CN 101072395 A 11/2007
(Continued)

OTHER PUBLICATIONS

First Search Report issued to Chinese counterpart Application No. 202210936339.7 dated Oct. 15, 2024.
(Continued)

*Primary Examiner* — Disler Paul
(74) *Attorney, Agent, or Firm* — McNees Wallace & Nurick LLC

(57) ABSTRACT

Provided is a meeting speaker box for a mobile terminal. One end of a flip assembly is connected to a casing. A connector is disposed at another end of the flip assembly, and is configured to be plugged in and communicatively connected to the mobile terminal. The flip assembly is configured to enable the casing to rotate between a first position where the casing fits the screen of the mobile terminal and a second position where the casing fits the back of the mobile terminal. A first speaker is disposed in the casing and is configured to amplify the sound of the mobile terminal. A detection assembly is disposed in the casing and is configured to detect the position of the casing. A control unit is communicatively connected to the detection assembly and the first speaker.

24 Claims, 9 Drawing Sheets

(51) Int. Cl.
  *H04R 1/28* (2006.01)
  *H04R 1/32* (2006.01)
  *H04R 1/40* (2006.01)
  *H04R 3/00* (2006.01)
  *H04R 3/12* (2006.01)
  *H04R 29/00* (2006.01)
  *H04M 1/02* (2006.01)

(52) U.S. Cl.
  CPC ............ *H04R 1/288* (2013.01); *H04R 1/323* (2013.01); *H04R 1/326* (2013.01); *H04R 1/403* (2013.01); *H04R 1/406* (2013.01); *H04R 3/005* (2013.01); *H04R 29/001* (2013.01); *H04M 1/0214* (2013.01); *H04R 2201/025* (2013.01); *H04R 2499/11* (2013.01)

(58) Field of Classification Search
  CPC .. H04R 1/288; H04R 2499/11; H04R 1/0214; H04R 1/02; H04R 1/28; H04R 2201/025
  See application file for complete search history.

(56) References Cited

U.S. PATENT DOCUMENTS

| | | | |
|---|---|---|---|
| 2009/0180660 | A1 | 7/2009 | Groset et al. |
| 2011/0136546 | A1 | 6/2011 | Otsuki |
| 2014/0112494 | A1* | 4/2014 | Lee ........................ H04R 1/025 29/428 |
| 2015/0341712 | A1 | 11/2015 | Wilcox et al. |
| 2022/0353361 | A1* | 11/2022 | Kim ..................... H04M 1/0214 |

FOREIGN PATENT DOCUMENTS

| | | |
|---|---|---|
| CN | 103108263 A | 5/2013 |
| CN | 102594955 B | 8/2015 |
| CN | 105663151 A | 6/2016 |
| CN | 214045910 U | 8/2021 |
| CN | 216700227 U | 6/2022 |
| JP | H08186628 A | 7/1996 |
| JP | 2015164252 A | 9/2015 |
| JP | 2015164255 A | 9/2015 |

OTHER PUBLICATIONS

Notice of Allowance issued to Japanese counterpart Application No. 2022-188346 dated Jan. 23, 2024.

First Office Action issued to Chinese counterpart Application No. 202210936339.7 dated Oct. 23, 2024.

* cited by examiner

MEETING SPEAKER BOX FOR A MOBILE TERMINAL

CROSS-REFERENCE TO RELATED APPLICATION

This application claims priority to Chinese Patent Application No. 202210936339.7 filed Aug. 5, 2022, the disclosure of which are incorporated herein by reference in their entireties.

TECHNICAL FIELD

The present disclosure relates to the technical field of speaker boxes and, in particular, a meeting speaker box for a mobile terminal.

BACKGROUND

The application of mobile phones is becoming more and more widespread, and a mobile phone becomes a necessary tool for modern people. The requirements of functions of a mobile phone are increasing, such as a simple dialogue between two people to a multi-party meeting requiring the participation of a third party, or even mobile phone meetings.

In the related art, most models of mobile phones have a hands-free feature, and people can use the hands-free feature of a mobile phone for multi-party meetings.

However, since the built-in loudspeaker of a mobile phone has limited power, the sound volume emitted is relatively low, and various interference signals are received by the built-in microphone of a mobile phone, thereby interfering with the transmission of sound. When the number of interlocutors is more than three, the sound effect is poor or even cannot be heard clearly, no matter the received audio signal or the sent audio signal. Moreover, because the loudspeaker of a mobile phone has a single sound direction, the interlocutors not in the sound direction of the loudspeaker cannot hear clearly.

The Bluetooth speaker box exists on the market. However, when the Bluetooth speaker box is used, it is necessary to carry an additional power supply line to supplement power for the speaker box. The volume of the Bluetooth speaker box is large and a power supply line is required, so the carrying is inconvenient.

In addition, a need for viewing the mobile phone screen during the meeting process exists. In the absence of a phone holder, manual gripping is required, resulting in inconvenience for multi-person meetings.

For this reason, an urgent need to study a meeting speaker box for a mobile phone to solve the problem of the single sound direction of the loudspeaker of a mobile phone.

SUMMARY

The present disclosure provides a meeting speaker box for a mobile terminal to solve the problem that a loudspeaker of a mobile terminal in related art has a single sound direction.

To achieve the objective, the present disclosure adopts the technical solutions below.

The present disclosure provides a meeting speaker box for a mobile terminal that includes a casing, a flip assembly, a connector, a first speaker, a detection assembly and a control unit.

One end of the flip member connected to the casing.

The connector is disposed at another end of the flip assembly and configured to be plugged in and communicatively connected to a mobile terminal. The flip assembly is configured to enable the casing to rotate between a first position where the casing fits the screen of the mobile terminal and a second position where the casing fits the back of the mobile terminal.

The first speaker is disposed in the casing and configured to amplify the sound of the mobile terminal.

The detection assembly is disposed in the casing and configured to detect the position of the casing.

The control unit is communicatively connected to the detection assembly and the first speaker. The control unit is configured to receive position information of the casing detected by the detection assembly and control the operation of the first speaker.

In an embodiment, the meeting speaker box for a mobile terminal also includes a second speaker disposed in the casing, communicatively connected to the control unit and configured to amplify the sound of the mobile terminal. When the casing is at the first position, the second speaker works. When the casing is at the second position, the first speaker works. When the casing is at a third position between the first position and the second position, both the first speaker and the second speaker work.

In an embodiment, the detection assembly includes a first detection member disposed on the front side of the casing and configured to detect the casing located at the first position, and a second detection member disposed on the back side of the casing and configured to detect the casing located at the second position.

In an embodiment, the casing includes a first casing and a second casing. The first casing and the second casing are fastened to each other, a mounting cavity is formed between the first casing and the second casing, and the first speaker and the second speaker are both located in the mounting cavity.

In an embodiment, one of the first speaker and the second speaker is secured to the first casing and the other one of the first speaker and the second speaker is secured to the second casing. The first casing is provided with first volume holes and the second casing is provided with second volume holes.

In an embodiment, at least two first speakers are provided, at least two second speakers are provided, and the at least two first speakers and the at least two second speakers are the same in number and are staggered clockwise.

In an embodiment, the first detection member and the second detection member are both located in the mounting cavity.

In an embodiment, the first casing is provided with a first detection hole, the first detection member is secured to the first casing, the first detection member detects a distance from the first detection member to a screen of the mobile terminal through the first detection hole; and the second casing is provided with a second detection hole, the second detection member is secured to the second casing, and the second detection member detects a distance from the second detection member to the back of the mobile terminal through the second detection hole.

In an embodiment, the meeting speaker box for a mobile terminal also includes a microphone assembly disposed on the casing and configured to receive a sound of a user.

In an embodiment, the microphone assembly includes a first microphone and a second microphone. The first microphone and the second microphone are located on the front and the back of the casing respectively.

In an embodiment, when the casing is at the first position, the second microphone works; when the casing is at the second position, the first microphone works; and when the casing is at a third position between the first position and the second position, both the first microphone and the second microphone work.

In an embodiment, the flip assembly includes a first flip member and a second flip member, the first flip member and the second flip member are rotatably connected to each other, the casing and the second flip member are rotatably connected to each other, and the connector is disposed on the first flip member.

In an embodiment, the flip assembly also includes a damping assembly, the damping assembly is disposed between the first flip member and the second flip member and configured to cause the first flip member to stop relative to the second flip member in any orientation. Alternatively or additionally, the damping assembly is disposed between the second flip member and the casing and is configured to cause the second flip member to stop relative to the casing in any orientation.

In an embodiment, the flip assembly also includes a rotary shaft and a rotary hole. One of the rotary shaft and the rotary hole is disposed on the first flip member, and the other one of the rotary shaft and the rotary hole is disposed on the second flip member. The rotary shaft extends through the rotary hole.

In an embodiment, the rotary shaft is disposed on the second flip member, the rotary hole is disposed on the first flip member, the first flip member is provided with a friction portion, the damping assembly includes a damping member, and the damping member is disposed around part of the rotary shaft and configured to abut against the friction portion.

In an embodiment, the surface roughness of the friction portion is greater than the surface roughness of the other part of the first flip member.

In an embodiment, the rotary shaft is disposed on the second flip member, and the rotary hole is disposed on the first flip member, where the damping assembly includes a damping ring and a damping sheet. The damping ring is provided with multiple elastic protrusions along a circumferential direction of the damping ring, multiple concavities are formed between the plurality of elastic protrusions, a caught portion protrudes from the damping sheet, the damping ring is secured to the rotary shaft, the damping sheet is secured to the first flip member, and when the second flip member rotates relative to the first flip member, the caught portion is allowed to be caught in one of the concavities.

In an embodiment, the damping ring includes a stopper and an elastic ring, where the section of the elastic ring is wave-shaped, each of the concavities are located between respective two adjacent waves of the elastic ring, and the stopper is disposed at an end of the elastic ring and abuts against the rotary shaft.

In an embodiment, the stopper is provided with a positioning hole, the end of the rotary shaft is provided with a positioning member, and the positioning member extends through the positioning hole.

In an embodiment, the stopper and the elastic ring are integrally formed.

In an embodiment, the damping ring and the rotary shaft are adhered to each other or welded to each other. Alternatively or additionally, the damping sheet and the first flip member are adhered to each other or welded to each other.

In an embodiment, the rotary shaft is provided with a through hole along the axial direction of the rotary shaft, a cable connecting the connector is partly located in the first flip member, and the cable passes through the through hole and is partly located in the second flip member.

In an embodiment, a casing connection portion protrudes from the casing, a second bypass portion is recessed in one end of the second flip member, the casing connection portion is located in the second bypass portion, and two sides of the casing connection portion are rotatably connected to two sides of the second bypass portion in a one-to-one manner. Alternatively or additionally, a second connection portion protrudes from another end of the second flip member, a first bypass portion is disposed on one end of the first flip member, the second connection portion is located in the first bypass portion, and two sides of the second connection portion are rotatably connected to two sides of the first bypass portion in a one-to-one manner.

In an embodiment, an end of the casing facing the second flip member and an end of the casing connection portion facing the second bypass portion are each provided with an arc surface. Alternatively or additionally, two ends of the second flip member, the bottom of the second bypass portion and an end of the second connection portion facing the first flip member are each provided with an arc surface. Alternatively or additionally, an end of the first flip member facing the second flip member is provided with an arc surface.

In an embodiment, the casing includes a front buffer configured to contact the screen of the mobile terminal. Alternatively or additionally, the casing includes a back buffer configured to contact the back of the mobile terminal.

The present disclosure has the beneficial effects below.

Figure 1:
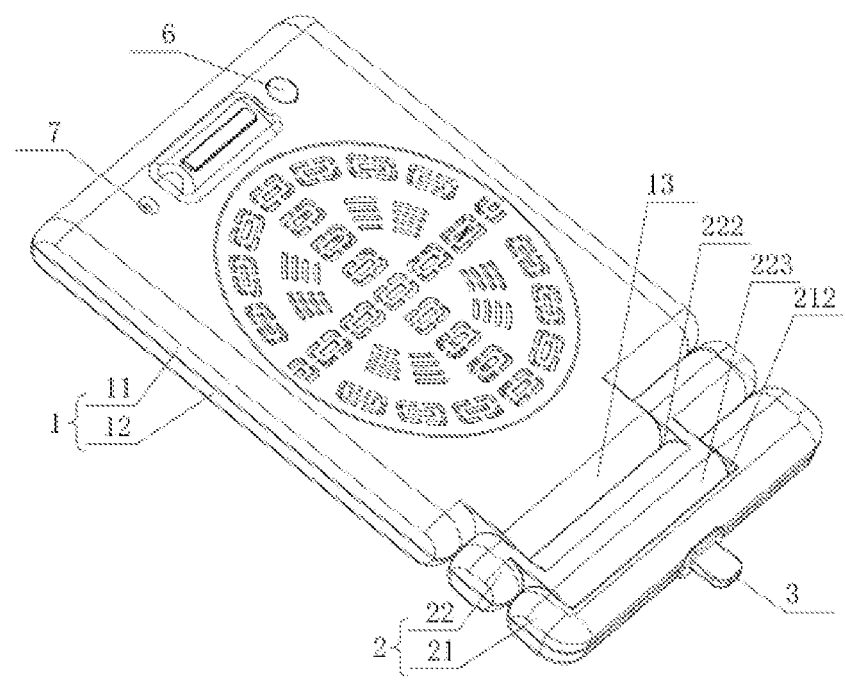
FIG. 1 is a view illustrating the structure of a meeting speaker box for a mobile terminal according to embodiments of the present disclosure.
Figure 2:
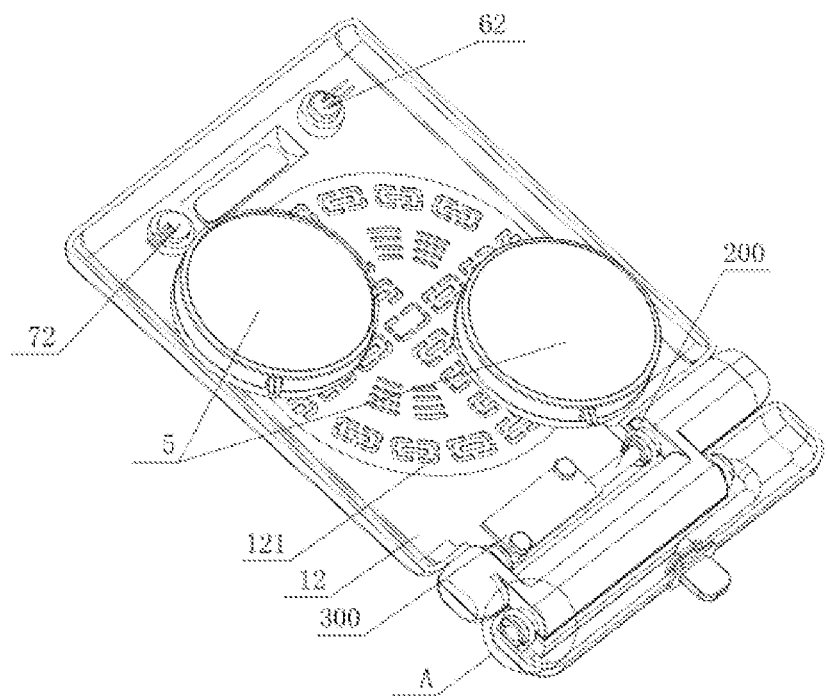
FIG. 2 is a view illustrating the structure of a second casing and a second speaker according to embodiments of the present disclosure.
Figure 3:
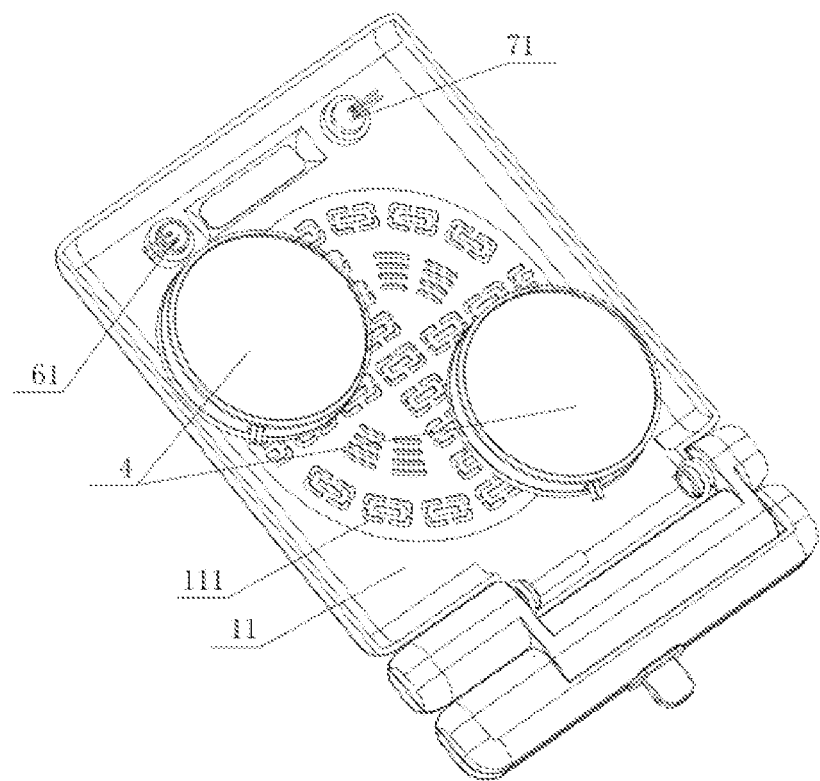
FIG. 3 is a view illustrating the structure of a first casing and a first speaker according to embodiments of the present disclosure.
Figure 4:
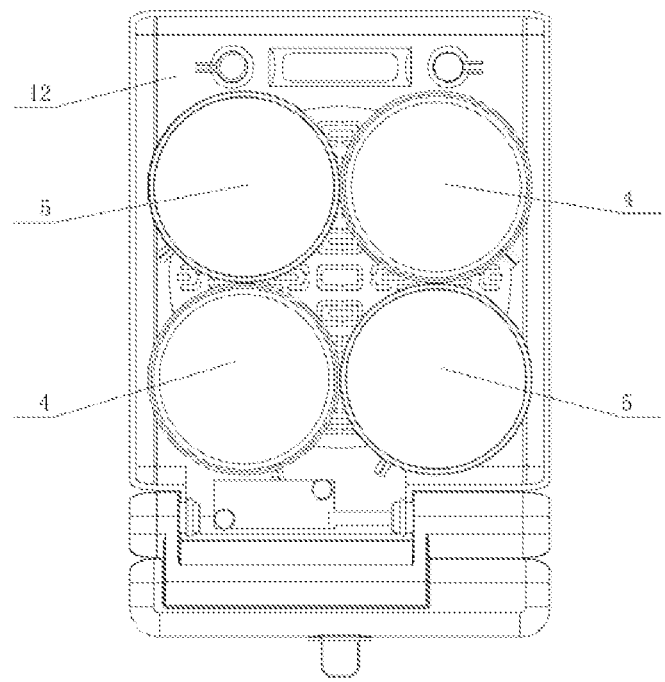
FIG. 4 is a view illustrating the inside structure of a meeting speaker box for a mobile terminal according to embodiments of the present disclosure.
Figure 5:
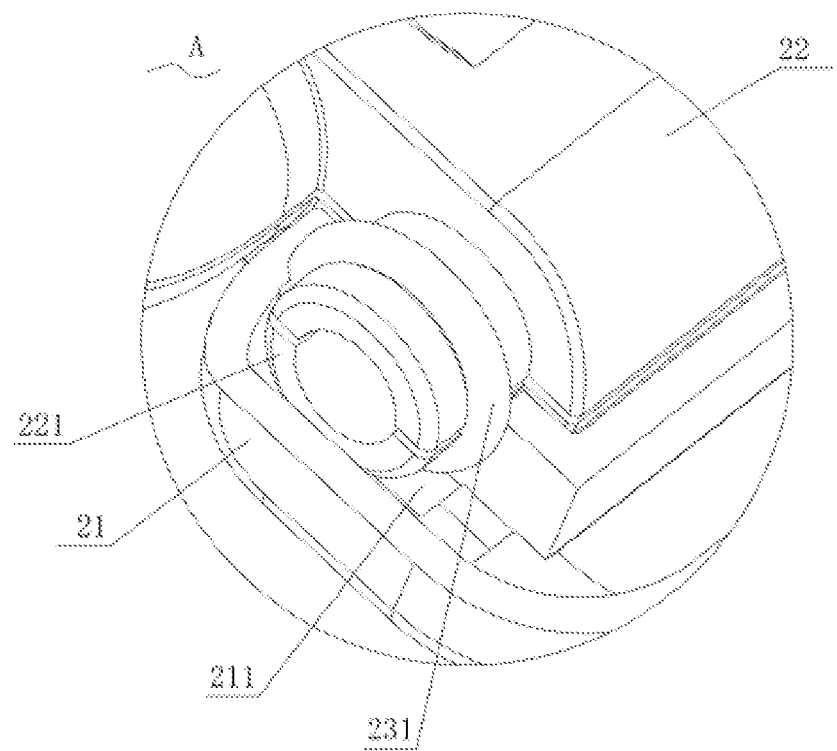
FIG. 5 is an enlarged view of part A of FIG. 2.
Figure 6:
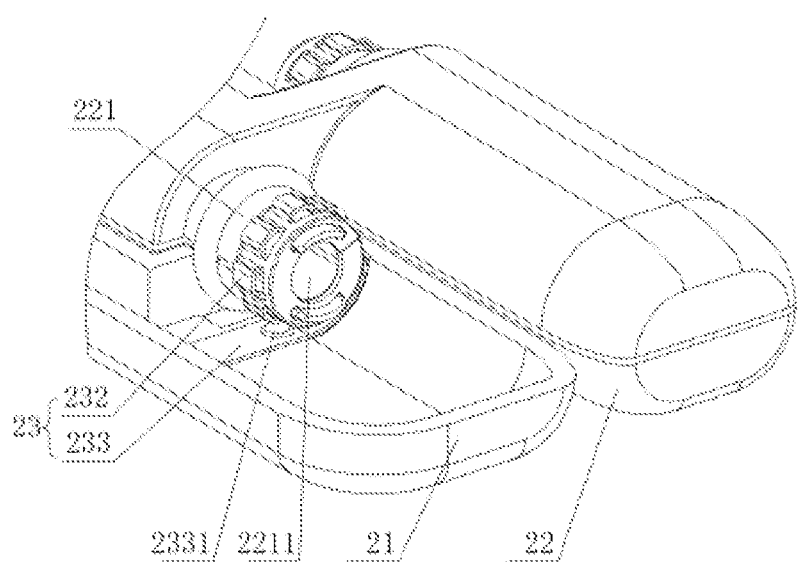
FIG. 6 is a view illustrating the structure of a damping ring and a stopper according to embodiments of the present disclosure.
Figure 7:
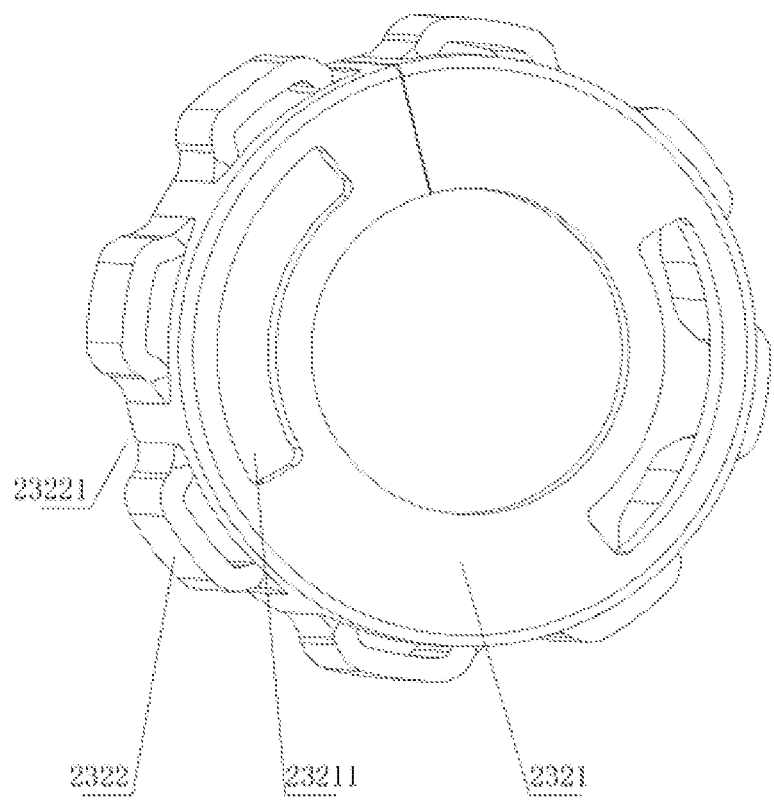
FIG. 7 is a view illustrating the structure of a damping ring according to embodiments of the present disclosure.
Figure 8:
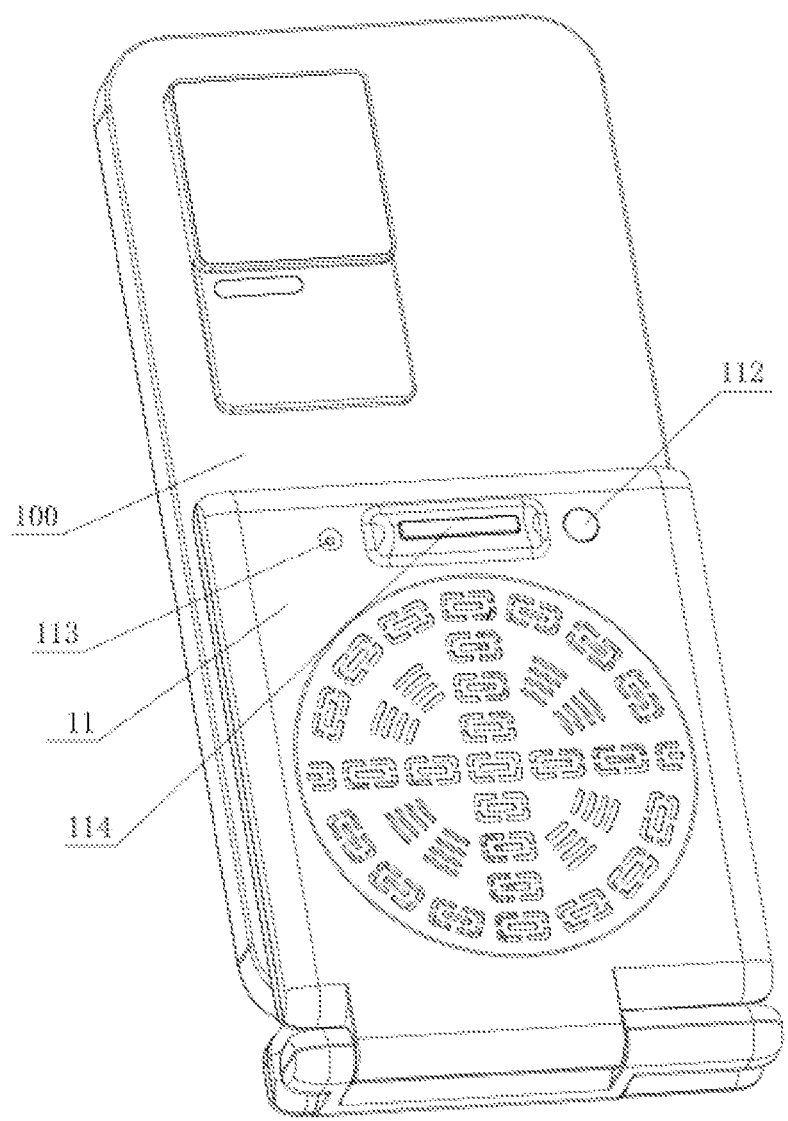
FIG. 8 is a view illustrating the structure of a meeting speaker box for a mobile terminal when the speaker box is placed at a second position according to embodiments of the present disclosure.
Figure 9:
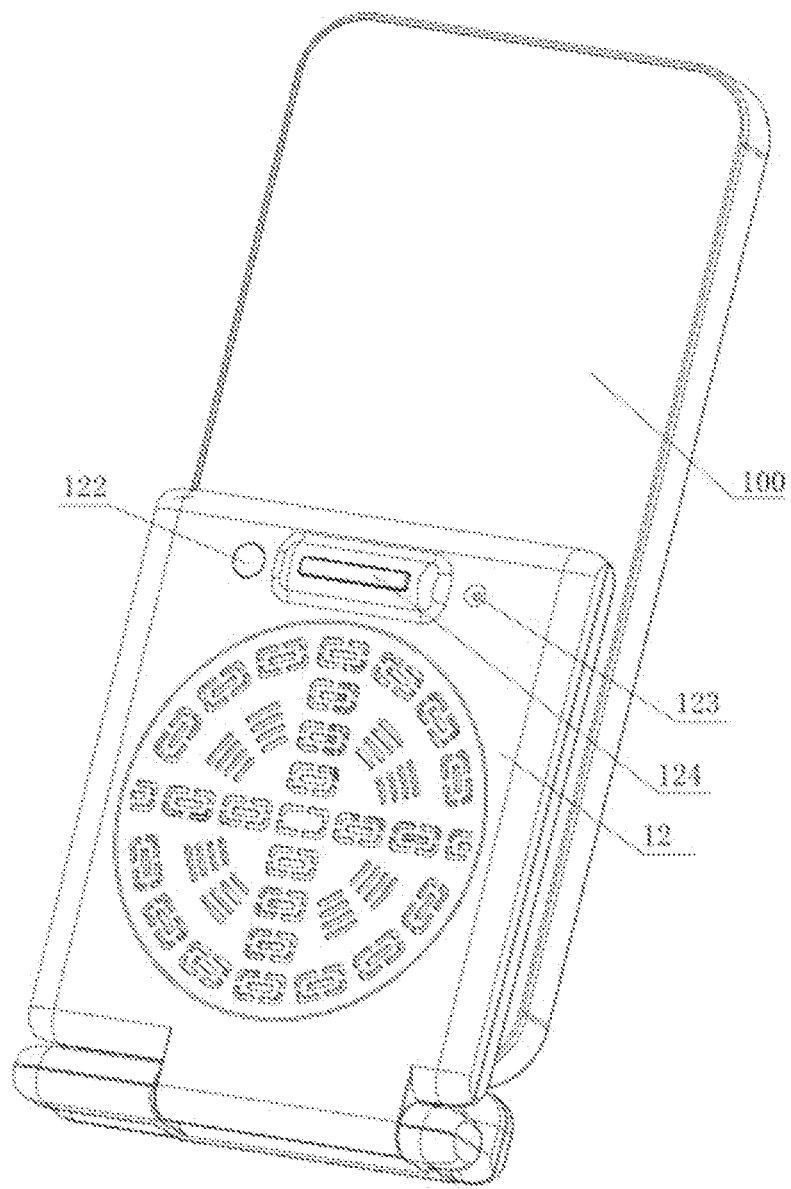
FIG. 9 is the perspective view illustrating the structure of a meeting speaker box for a mobile terminal when the speaker box is placed at a first position according to embodiments of the present disclosure.
Figure 10:
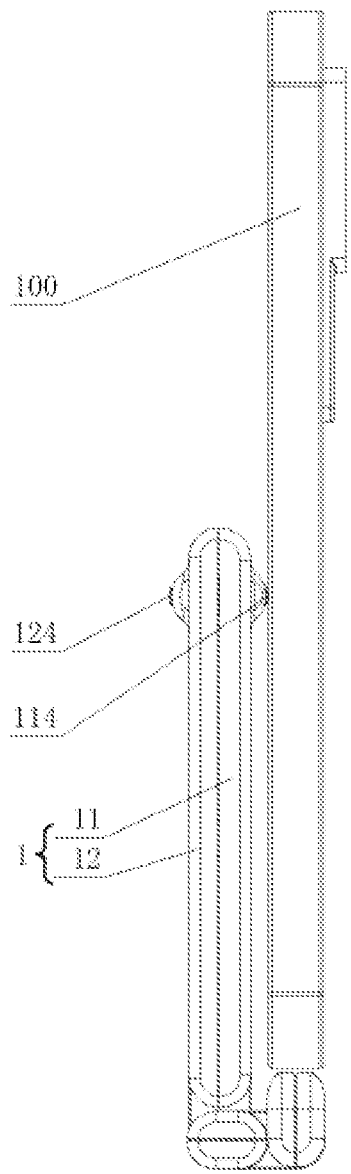
FIG. 10 is a right view illustrating the structure of a meeting speaker box for a mobile terminal when the speaker box is placed at the first position according to embodiments of the present disclosure.
Figure 11:
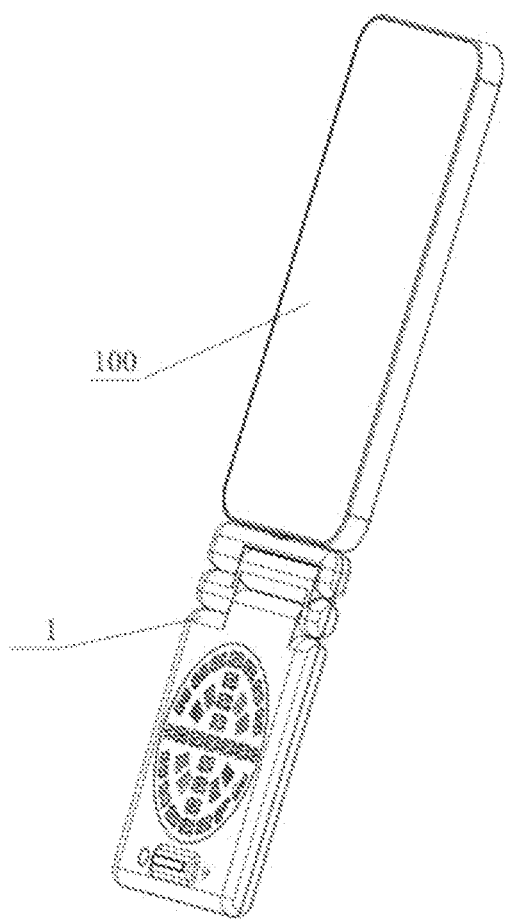
FIG. 11 is a first view illustrating the structure of a meeting speaker box for a mobile terminal when the speaker box is placed at a third position according to embodiments of the present disclosure.
Figure 12:
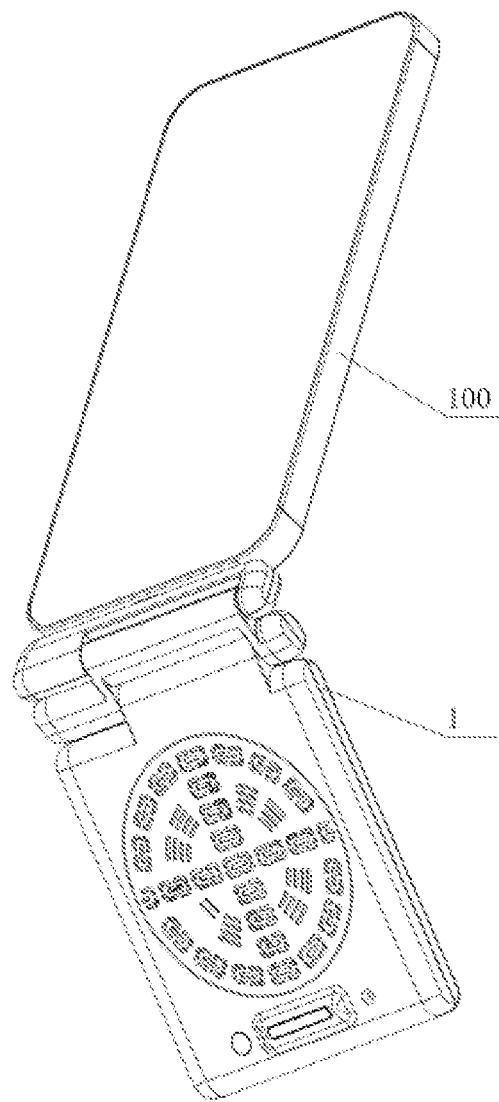
FIG. 12 is a second view illustrating the structure of a meeting speaker box for a mobile terminal when the speaker box is placed at the third position according to embodiments of the present disclosure.

REFERENCE LIST 100 mobile terminal
200 cable
300 control unit
1 casing
11 first casing
111 first volume hole
112 first detection hole
113 front sound hole
114 front buffer
12 second casing
121 second volume hole
122 second detection hole
123 back sound hole
124 back buffer
13 casing connection portion
2 flip assembly
21 first flip member
211 friction portion
212 first bypass unit
22 second flip member
221 rotary shaft
2211 through hole
222 second bypass unit
223 second connection portion
23 damping assembly
231 damping member
232 damping ring
2321 stopper
23211 positioning hole
2322 elastic ring
23221 concavity
233 damping sheet
2331 caught portion
3 connector
4 first speaker
5 second speaker
6 detection assembly
61 first detection member
62 second detection member
7 microphone assembly
71 first microphone
72 second microphone

DETAILED DESCRIPTION

The technical solutions of the present disclosure are described clearly and completely hereinafter in conjunction with drawings. Apparently, the described embodiments are part, not all, of embodiments of the present disclosure.

In the description of the present disclosure, it is to be noted that orientations or position relations indicated by terms such as "center", "upper", "lower", "left", "right", "vertical", "horizontal", "in", and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure.

In addition, terms such as "first" and "second" are used only for the purpose of description and are not to be construed as indicating or implying relative importance.

Terms "first position" and "second position" are two different positions. Moreover, when the first feature is described as "on", "above", or "over" the second feature, the first feature is right on, above, or over the second feature or the first feature is obliquely on, above, or over the second feature, or the first feature is simply at a higher level than the second feature.

When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present disclosure, it is to be noted that unless otherwise expressly specified and limited, the term "mounted", "connected to each other", or "connected" should be construed in a broad sense as securely connected, detachably connected, or integrally connected; mechanically connected or electrically connected; directly connected to each other or indirectly connected to each other via an intermediary; or interconnected between two components.

For those of ordinary skill in the art, specific meanings of the preceding terms in the present disclosure may be construed based on specific situations.

The embodiments of the present disclosure are described in detail below, and examples of the embodiments are illustrated in the drawings, where the same or similar reference numerals indicate the same or similar elements or elements having the same or similar functions.

The embodiments described below with reference to the drawings are merely exemplary and intended to explain the present disclosure, and are not to be construed as limiting the present disclosure.

In the related art, most modes of mobile terminals have a hands-free feature, and people can use the hands-free feature of a mobile terminal for multi-party meetings.

However, since the built-in loudspeaker of a mobile terminal has limited power, the sound volume emitted is relatively low, and various interference signals are received by the built-in microphone of the mobile terminal, thereby interfering with the transmission of sound. When the number of interlocutors is more than three, the sound effect is poor or even cannot be heard clearly, no matter of the received audio signal or the sent audio signal. Moreover, because the loudspeaker of a mobile terminal has a single sound direction, the interlocutors not in the sound direction of the loudspeaker cannot hear clearly.

The Bluetooth speaker box exists on the market. However, when the Bluetooth speaker box is used, it is necessary to carry an additional power supply line to supplement power for the speaker box. The volume of the Bluetooth speaker box is large and a power supply line is required, so the carrying is inconvenient.

In addition, a need for viewing the mobile terminal screen during the meeting process exists. In the absence of a phone holder, manual gripping is required, resulting in inconvenience for multi-person meetings.

In order to solve the above-mentioned problem of the single sound direction of a loudspeaker, referring to FIGS.

1 to 12, the present embodiment provides a meeting speaker box for a mobile terminal. The meeting speaker box for a mobile terminal includes a casing 1, a flip assembly 2, a connector 3, a first speaker 4, a second speaker 5, and a detection assembly 6. An end of the flip assembly 2 is connected to the casing 1. The connector 3 is disposed on another end of the flip assembly 2, and is configured to be plugged in and communicatively connected to the mobile terminal 100. The flip assembly 2 is configured to enable the casing 1 to rotate between a first position where the casing 1 fits the screen of the mobile terminal 100 and a second position where the casing 1 fits the back of the mobile terminal 100. The first speaker 4 is disposed on the front of the casing 1, and is configured to amplify the sound of the mobile terminal 100. The second speaker 5 is disposed on the back of the casing 1, and is configured to amplify the sound of the mobile terminal 100. The detection assembly 6 is disposed in the casing 1, and is configured to detect the position of the casing 1. When the casing 1 is at the first position, the second speaker 5 works. When the casing 1 is at the second position, the first speaker 4 works. When the casing 1 is at a third position between the first position and the second position, both the first speaker 4 and the second speaker 5 work. With the above-mentioned arrangement, the sound of the mobile terminal 100 can be amplified in three ways. Particularly, the sound of the mobile terminal 100 can be amplified by the first speaker 4 or by the second speaker 5 or by both the first speaker 4 and the second speaker 5 so that different meeting requirements can be met. Illustratively, when only one person or two people participate in a video or audio meeting in front of the screen of the mobile terminal 100, the casing 1 can be placed at the first position or the second position, and the sound of the mobile terminal 100 can be amplified by the first speaker 4 or the second speaker 5. When many people surround the mobile terminal, the casing 1 can be placed at the third position. At this time, the first speaker 4 and the second speaker 5 amplify the sound of the mobile terminal 100 at the same time, and due to the presence of the flip assembly 2, the casing 1 and the mobile terminal 100 can be placed on desks with an included angle. At this time, the propagation directions of the first speaker 4 and the second speaker 5 are both horizontal and opposite to each other so that the sound of the meeting can be clearly transmitted to people surrounding the mobile terminal 100.

Of course, in the above-mentioned embodiment, both the first speaker 4 and the second speaker 5 can only emit sound in single direction. Optionally, the first speaker 4 and the second speaker 5 can be integrally formed. In another embodiment, the first speaker 4 may be a double-sided speaker that can emit sound through one side or both sides. In this embodiment, the arrangement of the second speaker 5 may be directly discarded, and a double-sided speaker can achieve the same effect. In other embodiments, the first speaker 4 and the second speaker 5 may both be double-sided speakers so that a preferable stereo sound can be provided. In an embodiment, when the casing 1 is placed at the third position, the first speaker 4 and the second speaker 5 amplify the sound of the mobile terminal 100 through both sides at the same time. When the casing 1 is placed at the first position or the second position, the amplified sound is only emitted from a side, facing away from the mobile terminal 100, of a speaker which is farther from the mobile terminal 100.

In this embodiment, the mobile terminal 100 may be a mobile phone or a tablet computer. In each of the figures, the mobile terminal 100 has a configuration of a mobile phone.

It is to be noted that the meeting speaker box for a mobile terminal also includes a controller communicatively connected to the detection assembly 6, the first speaker 4, and the second speaker 5. When the controller receives the position signal of the detected casing 1 from the detection assembly 6, it controls the first speaker 4 and/or the second speaker 5 to work. The controller is disposed on the control unit 300, and when the control unit 300 is a circuit board, the controller is disposed on the circuit board.

When the included angle between the casing 1 and the mobile terminal 100 is about 90 degrees or about 270 degrees, the casing 1 can be used as a holder for the mobile terminal 100, and the mobile terminal 100 can be erected by the side. In particular, when the casing 1 is located at the back of the mobile terminal 100, that is, when the included angle between the casing 1 and the mobile terminal 100 is greater than 180 degrees, the casing 1 does not block the screen of the mobile terminal 100, and users can view the content of the film or meeting presentation through the screen of the mobile terminal 100 and have a better using experience.

With regard to the structure of the detection assembly 6, in this embodiment, optionally, the detection assembly 6 includes a first detection member 61 and a second detection member 62. The first detection member 61 is disposed on the front of the casing 1, and is configured to detect the casing 1 located at the first position. The second detection member 62 is disposed on the back of the casing 1, and is configured to detect the casing 1 located at the second position.

Particularly, the controller is communicatively connected to the first detection member 61 and the second detection member 62. With regard to the specific structure of the first detection member 61, in this embodiment, optionally, the first detection member 61 may be an infrared sensor. When the casing 1 fits the screen of the mobile terminal 100 fit, the first detection member 61 is shielded. At this time, the first detection member 61 emits a detection signal, and the controller controls the second speaker 5 to work. With regard to the specific structure of the second detection member 62, in this embodiment, optionally, the second detection member 62 may be an infrared sensor. When the casing 1 fits the back of the mobile terminal 100, the second detection member 62 is shielded. At this time, the second detection member 62 emits a detection signal, and the controller controls the first speaker 4 to work.

Of course, in other embodiments of the present embodiment, the first detection member 61 and the second detection member 62 may both be a distance sensor. Particularly, when the first detection member 61 detects that the distance from the first detection member 61 to the screen of the mobile terminal 100 is less than the preset distance, a detection signal is generated, and the controller controls the second speaker 5 to work. When the second detection member 62 detects that the distance from the second detection member 62 to the back of the mobile terminal 100 is less than the preset distance, a detection signal is generated, and the controller controls the first speaker 4 to work. Further, the preset distance may be 2 mm to 10 mm, and of course, in other embodiments, the preset distance may be 1 mm or 0 mm.

To facilitate the design, processing and production of the speaker box, in this embodiment, optionally, the casing 1 includes a first casing 11 and a second casing 12. The first casing 11 and the second casing 12 are fastened to each other, a mounting cavity is formed between the first casing 11 and the second casing 12, and the first speaker 4 and the second speaker 5 are both located in the mounting cavity.

This arrangement protects the first speaker 4 and the second speaker 5 from external force impact.

Optionally, the first casing 11 and the second casing 12 may be connected by screw threads, clamps, or adhesives. Optionally, one of the first speaker 4 and the second speaker 5 is secured to the first casing 11 and the other one of the first speaker 4 and the second speaker 5 is secured to the second casing 12. The first casing 11 is provided with first volume holes 111 and the second casing 12 is provided with second volume holes 121. Particularly, the relative position of the first speaker 4 and the second speaker 5 may be provided according to the relative position of the first casing 11 and the second casing 12. Illustratively, the first casing 11 can fit the screen of the mobile terminal 100. In this embodiment, the second speaker 5 is secured to the second casing 11. This arrangement makes the sound of a fixed speaker more easily propagated, and since the connection lines of the speaker are disposed on the back, the above-mentioned arrangement facilitates the arrangement of the lines.

With regard to the number of speakers, in this embodiment, optionally, at least two first speakers 4 are provided, and at least two second speakers 5 are provided. In one hand, the above-mentioned arrangement of the number of speakers enables the external play volume to be increased, and in the other hand, when one of the speakers on the same side is damaged, the damaged speaker can be replaced by the rest speaker so that the work is not delayed.

Optionally, the thickness of the first speaker 4 is the same as the thickness of the second speaker 5, the back of the first speaker 4 and the front of the second speaker is coplanar, and the front of the first speaker 4 and the back of the second speaker 5 is coplanar.

The above-mentioned arrangement of the thickness of speakers makes it possible to use the inside space of the casing 1 as reasonably as possible. Of course, in order to obtain different use effects or to adapt to different working requirements, the power of the second speaker 5 may be set to be greater than the power of the first speaker 4. At this time, the thickness of the second speaker 5 may be greater than the thickness of the first speaker 4.

For ease of installation, in this embodiment, optionally, the first speakers 4 and the second speakers 5 are the same in number and are staggered clockwise. This arrangement helps to achieve an even distribution of gravity, makes the meeting speaker box for a mobile terminal feel better, and helps to improve the stability of placement on the desktop.

In this embodiment, optionally, the first detection member 61 and the second detection member 62 are both located in the mounting cavity. The above-mentioned arrangement of the position of speakers can protect the first detection member 61 and the second detection member 62 from external force impact, and help to improve the service life of the first detection member 61 and the second detection member 62 As to the detection method, particularly, the first casing 11 is provided with a first detection hole 112, the first detection member 61 is secured to the first casing 11, and the first detection member 61 detects the distance from the first detection member 61 to the screen of the mobile terminal 100 through the first detection hole 112. The second casing 12 is provided with a second detection hole 122, the second detection member 62 is secured to the second casing 12, and the second detection member 62 detects the distance from the second detection member 62 to the back of the mobile terminal 100 through the second detection hole 122. The first detection hole 112 and the second detection hole 122 are provided so that the mounting cavity communicates with the outside, thereby enabling transmission of the detection signal. Further, two protective covers are disposed on the first detection hole 112 and the second detection hole 122 respectively. The protective cover is made of glass.

In another embodiment, the first casing 11 and the second casing 12 may be made of a transparent material. In this case, the first detection hole 112 and the second detection hole 122 may not be provided. Moreover, the inside structure can be observed. When the first detection member 61 and the second detection member 62 are photosensors, the position of the casing can be quickly detected.

In view of the fact that it is difficult for the microphone of the mobile terminal 100 to clearly receive the sound of attendees in different directions during the meeting, the meeting speaker box for a mobile terminal also includes a microphone assembly 7 disposed on the casing 1. The microphone assembly 7 is configured to receive the sound of the attendees.

Particularly, referring to the first speaker 4 and the second speaker 5, the microphone assembly 7 includes a first microphone 71 and a second microphone 72. The first microphone 71 and the second microphone 72 are located on the front and the back of the casing 1 respectively. When the casing 1 is at the first position, the second microphone 72 works. When the casing 1 is at the second position, the first microphone 71 works. When the casing 1 is at a third position between the first position and the second position, both the first microphone 71 and the second microphone 72 work. The arrangement of the two microphones can realize the collection of the multi-directional sound of the attendees. The two microphones are disposed in the mounting cavity. The first casing 11 is provided with a front sound hole 113, the first microphone 71 receives the sound of users through the front sound hole 113, the second casing 12 is provided with a back sound hole 123, and the second microphone 72 receives the sound of users through the back sound hole 123.

To protect the screen of the mobile terminal 100 from scratching, in this embodiment, optionally, the casing 1 includes a front buffer 114 configured to contact the screen of the mobile terminal 100. The front buffer 114 may be a rubber material or a silica gel material.

Optionally, the front of the casing 1 is provided with a front support portion, and the front buffer 114 is disposed on the front support portion. The arrangement of the front support portion helps to enlarge the distance between the casing 1 and the screen of the mobile terminal 100. In one hand, under the condition where the front buffer 114 can perform the buffering function, the thickness may be as thin as possible so that the entire casing 1 is prevented from sticking to the screen of the mobile terminal 100. In the other hand, the working mode of the meeting speaker box for a mobile terminal may be that when the casing 1 is at any position, both two speakers work. Alternatively in another embodiment, when the casing 1 is at the first position, both the first speaker 4 works and the second speaker 5 works, and when the casing 1 is at the second position, the first speaker 4 works. In this embodiment, the front support portion is provided so that when the front buffering fits the screen of the mobile terminal 100, a gap can be remained between most of the front of the casing 1 and the screen of the mobile terminal 100. Through the gap the sound of the first speaker 4 can be transmitted. Optionally, the distance of the front support portion protruding from the front of the casing 1 may be 2 mm to 5 mm, that is, when the front buffer 114 and the screen of the mobile terminal 100 are fitted, the distance between the position where the first volume hole 111 is disposed on the first casing 11 from the screen of the mobile terminal 100 is 2 mm to 5 mm.

To protect the back of the mobile terminal 100 from scratching, optionally, the casing 1 includes a back buffer 124 configured to contact the back of the mobile terminal 100. The back cushioning member 124 may be a rubber material or a silica gel material.

Further, the back of the casing 1 is provided with a back support portion, and the back buffer 124 is disposed on the back support portion. In one hand, the back buffer 124 can perform the buffering function. The thickness may be as thin as possible so that the entire casing 1 is prevented from sticking to the back of the mobile terminal 100. On the other hand, in the presence of the above-mentioned back support portion, the working mode of the meeting speaker box for a mobile terminal may be that when the casing 1 is at any position, both two speakers work. Alternatively, in another embodiment, when the casing 1 is at the first position, the second speaker 5 works, and when the casing 1 is at the second position, both the first speaker 4 and the second speaker 5 work. For setting of the height of the back support portion, see description of the front support portion.

In an embodiment, the front of the casing 1 is provided with a front support portion, and a back support portion protrudes from the back of the casing 1. This arrangement can protect the screen of the mobile terminal 100 from scratching, and protect the back of the mobile terminal 100 from scratching.

Of course, in the embodiment where the back support portion and the front support portion both exist, the working mode of the meeting speaker box for a mobile terminal may be that when the casing 1 is at any position, both the two speakers work. Alternatively, when the casing 1 is at the first position, the first speaker 4 works, and when the casing 1 is at the second position, the second speaker 5 works.

In the embodiment where the back support portion and the front support portion both exist, the working mode of the first microphone 71 and the second microphone 72 may refer to the working mode of the first speaker 4 and the second speaker 5, and is not limited to a specific working mode. Illustratively, when the casing 1 is at the first position, the first microphone 71 works, and when the casing 1 is at the second position, the second microphone 72 works. In another implementation of the present embodiment, when the casing 1 is at any position, both the first microphone 71 and the second microphone 72 work.

With regard to the flip assembly 2, in this embodiment, optionally, the flip assembly 2 includes a first flip member 21 and a second flip member 22. The first flip member 21 and the second flip member 22 are rotatably connected to each other. The casing 1 and the second flip member 22 are rotatably connected to each other. A connector 3 is disposed on the first flip member 21. The arrangement of the two flip members enables the casing 1 to switch between the first position and the second position. This arrangement is more comfortable to use and appears to be more scientific.

In this embodiment, optionally, a casing connection portion 13 protrudes from the casing 1, a second bypass portion 222 is recessed in one end of the second flip member 22, the casing connection portion 13 is located in the second bypass portion 222, and two sides of the casing connection portion 13 are rotatably connected to two sides of the second bypass portion in a one-to-one manner. The arrangement of the above-mentioned structure helps to reduce the overall size of the casing 1 and the second flip member 22.

In another embodiment, a second connection portion 223 protrudes from another end of the second flip member 223, a first bypass portion 212 is disposed at one end of the first flip member 21, the second connection portion 223 is located in the first bypass portion 212, and two sides of the second connection portion 223 are rotatably connected to two sides of the first bypass portion 212 in a one-to-one manner. The arrangement of the above-mentioned structure helps to reduce the overall size of the second flip member 22 and the first flip member 21.

In a third embodiment, a casing connection portion 13 protrudes from the casing 1, a second bypass portion 222 is recessed in one end of the second flip member 22, the casing connection portion 13 is located in the second bypass portion 222, and two sides of the casing connection portion 13 are rotatably connected to two sides of the second bypass portion in a one-to-one manner; and a second connection portion 223 protrudes from another end of the second flip member 223, a first bypass portion 212 is disposed at one end of the first flip member 21, the second connection portion 223 is located in the first bypass portion 212, and two sides of the second connection portion 223 are rotatably connected to two sides of the first bypass portion 212 in a one-to-one manner. The arrangement of the above-mentioned structure helps to reduce the overall size of the flip assembly 2.

In order to further reduce the size of the flip assembly 2, the present embodiment is provided with three embodiments. In the first embodiment, an end of the casing 1 facing the second flip member 22 and an end of the casing connection portion 13 facing the second bypass portion 222 are each provided with an arc surface. In the second embodiment, the two ends of the second flip member 22, the bottom of the second bypass portion 222, and an end of the second connection portion 223 facing the first flip member 21 are each provided with an arc surface. In the third embodiment, an end of the first flip member 21 facing the second flip member 22 is provided with an arc surface. In other words, the adjacent ends of the casing 1 and the second flip member 22 each have a semi-cylindrical structure, and the adjacent ends of the second flip member 22 and the first flip member 21 each have a semi-cylindrical structure. Under the condition where the flip assembly 2 is bendable, the arrangement of the above-mentioned arc surfaces makes it possible to reduce the gap between the casing 1 and the second flip member 22 and the gap between the second flip member 22 and the first flip member 21 as much as possible, and further reduces the size of the flip member 2. It should be noted that the above-mentioned three embodiments can be implemented separately or any two or three at the same time, so long as the circular arc surface is present, it is advantageous to reduce the size of the flip assembly 2. Further, each arc surface gradually contracts from the middle to the sides of the meeting speaker box so that the gap between the casing 1 and the second flip member 22 and the gap between the second flip member 22 and the first flip member 21 gradually expand from the middle to the sides of the meeting speaker box, avoiding the interference between the flip member 2 and the second flip member 22 and the interference between the second flip member 22 and the first flip member 21 during the bending process of the flip assembly 2.

The flip assembly 2 further includes a damping assembly 23. As to the arrangement of the damping assembly 23, in another embodiment, the damping assembly 23 is disposed between the first flip member 21 and the second flip member 22, and is configured to cause the first flip member to stop relative to the second flip member in any orientation. The damping assembly 23 is arranged to fix the relative position of the first flip member 21 with respect to the second flip member 22, thereby helping to fix the relative position of the mobile terminal 100 and the meeting speaker box for a mobile terminal. In addition, the arrangement can improve the hand feel and the user experience.

In another embodiment, the damping assembly 23 is disposed between the second flip member 22 and the casing 1. The damping assembly 23 is configured to cause the second flip member 22 to stop relative to the casing 1 in any orientation. The damping assembly 23 is arranged to fix the relative positions of the second flip members 22 and casing 1, thereby helping to fix the relative positions of the mobile terminal 100 and the meeting speaker box for a mobile terminal. In addition, the arrangement can improve the hand feel and the user experience.

In the third embodiment, the damping assembly 23 is disposed between the first flip member 21 and the second flip member 22 and between the second flip member 22 and the casing 1. The above-mentioned arrangement allows the meeting speaker box for a mobile terminal to be stopped relative to the mobile terminal 100 in any orientation.

As to the rotatable connection relation, in this embodiment, particularly, the flip assembly 2 further includes a rotary shaft 221 and a rotary hole. One of the rotary shaft 221 and the rotary hole is disposed on the first flip member 21, and the other is disposed on the second flip member 22. The rotary shaft 221 extends through the rotary hole. In other embodiments, the first flip member 21 and the second flip member 22 may also be rotatably connected by means of a hinge.

As to the structure of the damping assembly 23, in this embodiment, optionally, the rotary shaft 221 is disposed on the second flip member 22, the rotary hole is disposed on the first flip member 21, the first flip member 21 is provided with a friction portion 211, the damping assembly 23 includes a damping member 231, and the damping member 231 is disposed around part of the rotary shaft 221 and can abut against the friction portion 211. Particularly, the damping member 231 is a rubber ring, and the rubber ring is sleeved on rotary shaft 221. The above-mentioned arrangement can perform a damping function and a seal function, avoiding dust from entering the first flip member 21.

Optionally, the surface roughness of the friction portion 211 is greater than the surface roughness of other part of the first flip member 21. This arrangement makes the frictional force between the damping member 231 and the friction portion 211 greater, thereby helping to improve the locking effect of the relative position between the first flip member 21 and the second flip member 22.

With regard to the preparation of the friction portion 211, in this embodiment, optionally, the friction portion 211 is prepared by texturing technique. Of course, in other embodiments, the preparation of the friction portion 211 can be realized by fixing a friction plate being processed by texturing technique on the flip member 21.

As to the structure of the damping assembly 23, in another embodiment, optionally, the rotary shaft 221 is disposed on the second flip member 22, and the rotary hole is disposed on the first flip member 21. The damping assembly 23 includes a damping ring 232 and a damping sheet 233. The damping ring 232 is provided with multiple elastic protrusions along a circumferential direction of the damping ring 232. Multiple concavities 23221 are formed between the plurality of elastic protrusions, a caught portion 2331 protrudes from the damping sheet 233, the damping ring 232 is secured to the rotary shaft 221, and the damping sheet 233 is secured to the first flip member 21. When the second flip member 22 rotates relative to the first flip member 21, the caught portion 2331 is allowed to be caught in one of the concavities 23221. Because of the above-mentioned arrangement of the concavities 23221 and the caught portions 2331, when the first flip member 21 and the second flip member 22 rotate, a distinct sense of frustration may appear, raising the hand feel of the operation. Because the caught portion 2331 is allowed to be caught in the concavities 23221, the fixing of the first flip member 21 and the second flip member 22 is more firmly. The spring force has to be overcome before the angle between the first flip member 21 and the second flip member 22 changes.

Particularly, the damping ring 232 includes a stopper 2321 and an elastic ring 2322. The section of the elastic ring 2322 is wave-shaped. The stopper 2321 is disposed at an end of the elastic ring 2322, and abuts against of an end of the rotary shaft 221. The above-mentioned arrangement makes the design and manufacture of the damping ring 232 easier and more feasible, thus reducing the cost. Moreover, the arrangement of the stopper piece 2321 helps to determine the mounting position of the damping ring 232, thus improving the mounting efficiency.

In an embodiment, the stopper 2321 and the elastic ring 2322 are integrally formed. Particularly, the damping ring 232 is formed by stamping a sheet-like member or by bending after stamping. This technique makes the cost of the damping ring 232 as low as possible, and makes the connection between the stopper 2321 and the elastic ring 2322 more secure.

In this embodiment, optionally, the stopper 2321 is provided with a positioning hole 23211. The end of the rotary shaft 221 is provided with a positioning member. The positioning member extends through the positioning hole 23211. In this arrangement, the positioning hole 23211 and the positioning member improves the installation accuracy and efficiency. Moreover, when the relative rotation between the first flip member 21 and the second flip member 22 occurs, the relative rotation between the damping ring 232 and the rotary shaft 221 is prevented so that the positioning accuracy between the damping ring 232 and the damping sheet 233 is improved, thereby facilitating the positioning accuracy between the first flip member 21 and the second flip member 22.

Optionally, the damping ring 232 and the rotary shaft 221 are adhered to each other or welded to each other. In addition, the damping sheet 233 and the first flip member 21 are adhered to each other or welded to each other. The weld may be implemented by laser weld or ultrasonic weld technique. When the positioning member is a plastic material, it can be fixedly connected to the stopper 2321 by melting.

In an embodiment, two the damping sheets 233 are provided. The two damping sheets 233 are disposed on the circumferential direction of the damping ring 232 and are symmetrical with respect to the center of the damping ring 232.

The two damping pieces 233 are provided so that the two concavities 23221 of the damping ring 232 are both clamped to the caught portions 2331 of the two damping pieces 233, thereby further improving the damping effect.

Optionally, the damping ring 232 and the damping sheet 233 may be a beryllium bronze, or other elastic metal materials. The caught portion 2331 is a protrusion structure formed when one side of the damping sheet 233 is stamped.

In another embodiment, the solution including the damping ring 232 and the damping sheet 233 and the solution including the damping member 231 and the friction portion 211 may co-exist to further increase the damping coefficient between the first flip member 21 and the second flip member 22.

Since a cable 200 is provided between the control unit 300 and the connector 3, the control unit 300 is disposed on the second casing 11, and the connector 3 is mounted on the first flip member 21, the cable 200 needs to pass through the second flip member 22 to avoid that the cable 200 is subjected to abrasion when the first flip member 21 and the second flip member 22 are relatively rotated. In this embodiment, optionally, along the axial direction, the rotary shaft 221 is provided with a through hole 2211. The cable 200 connecting the connector 3 is partly located in the first flip member 21. The cable 200 passes through the through hole 2211 and is partly located in the second flip member 22.

In an embodiment, the connector 3 includes a USB-C interface or a lighting interface. This arrangement enables the mobile terminal 100 to be electrically connected to the connector 3 when the mobile terminal 100 is plugged into the connector 3, avoiding that the meeting speaker box for a mobile terminal needs separate power supply during the use process, thus further simplifying the accessories of the meeting speaker box for a mobile terminal, and providing convenience for the use and carrying of the meeting speaker box for a mobile terminal.

Apparently, the preceding embodiments of the present disclosure are only illustrative of the present disclosure and are not intended to limit the implementations of the present disclosure. For those of ordinary skill in the art, changes or alterations in other different forms may also be made based on the preceding description. All implementations cannot be and do not need to be exhausted herein.

What is claimed is:

1. A meeting speaker box for a mobile terminal, comprising:
    a casing;
    a flip assembly, wherein one end of the flip assembly is connected to the casing, wherein the flip assembly comprises a first flip member and a second flip member, the first flip member and the second flip member are rotatably connected to each other, the casing and the second flip member are rotatably connected to each other;
    a connector disposed on the first flip member, wherein the connector is configured to be plugged in and communicatively connected to the mobile terminal, and the flip assembly is configured to enable the casing to rotate between a first position where the casing fits the screen of the mobile terminal and a second position where the casing fits the back of the mobile terminal;
    a first speaker disposed in the casing and configured to amplify a sound of the mobile terminal;
    a detection assembly disposed in the casing and configured to detect a position of the casing; and
    a control unit communicatively connected to the detection assembly and the first speaker, wherein the control unit is configured to receive position information of the casing detected by the detection assembly and control an operation of the first speaker.

2. The meeting speaker box for a mobile terminal according to claim 1, further comprising a second speaker, wherein the second speaker is disposed in the casing, communicatively connected to the control unit, and configured to amplify the sound of the mobile terminal, and wherein the second speaker works when the casing is at the first position, the first speaker works when the casing is at the second position, and both the first speaker and the second speaker work when the casing is at a third position between the first position and the second position.

3. The meeting speaker box for a mobile terminal according to claim 2, wherein the detection assembly comprises a first detection member and a second detection member, wherein the first detection member is disposed on a front side of the casing and is configured to detect the casing located at the first position, and the second detection member is disposed on a back side of the casing and is configured to detect the casing located at the second position.

4. The meeting speaker box for a mobile terminal according to claim 3, wherein the casing comprises a first casing and a second casing, the first casing and the second casing are fastened to each other, a mounting cavity is formed between the first casing and the second casing, and the first speaker and the second speaker are both located in the mounting cavity.

5. The meeting speaker box for a mobile terminal according to claim 4, wherein one of the first speaker and the second speaker is secured to the first casing, the other one of the first speaker and the second speaker is secured to the second casing, the first casing is provided with first volume holes, and the second casing is provided with second volume holes.

6. The meeting speaker box for a mobile terminal according to claim 4, wherein the first detection member and the second detection member are both located in the mounting cavity.

7. The meeting speaker box for a mobile terminal according to claim 6, wherein the first casing is provided with a first detection hole, the first detection member is secured to the first casing, and the first detection member is configured to detect a distance from the first detection member to the screen of the mobile terminal through the first detection hole; and wherein the second casing is provided with a second detection hole, the second detection member is secured to the second casing, and the second detection member is configured to detect a distance from the second detection member to the back of the mobile terminal through the second detection hole.

8. The meeting speaker box for a mobile terminal according to claim 2, wherein at least two first speakers are provided, and at least two second speakers are provided, wherein the at least two first speakers and the at least two second speakers are the same in number and are staggered clockwise.

9. The meeting speaker box for a mobile terminal according to claim 2, further comprising a microphone assembly disposed on the casing and configured to receive a sound of a user.

10. The meeting speaker box for a mobile terminal according to claim 9, wherein the microphone assembly comprises a first microphone and a second microphone, wherein the first microphone and the second microphone are located on a front of the casing and a back of the casing respectively.

11. The meeting speaker box for a mobile terminal according to claim 10, wherein the second microphone works when the casing is at the first position, the first microphone works when the casing is at the second position, and both the first microphone and the second microphone work when the casing is at the third position between the first position and the second position.

12. The meeting speaker box for a mobile terminal according to claim 1, wherein the flip assembly further comprises a damping assembly, wherein:
    the damping assembly is disposed between the first flip member and the second flip member and configured to cause the first flip member to stop relative to the second flip member in any orientation; and/or the damping assembly is disposed between the second flip member and the casing and is configured to cause the second flip member to stop relative to the casing in any orientation.

13. The meeting speaker box for a mobile terminal according to claim 12, wherein the flip assembly further comprises a rotary shaft and a rotary hole, wherein one of the rotary shaft and the rotary hole is disposed on the first flip member, the other one of the rotary shaft and the rotary hole is disposed on the second flip member, and the rotary shaft extends through the rotary hole.

14. The meeting speaker box for a mobile terminal according to claim 13, wherein the rotary shaft is disposed on the second flip member, the rotary hole is disposed on the first flip member, the first flip member is provided with a friction portion, the damping assembly comprises a damping member, and the damping member is disposed around part of the rotary shaft and configured to abut against the friction portion.

15. The meeting speaker box for a mobile terminal according to claim 14, wherein a surface roughness of the friction portion is greater than a surface roughness of another part of the first flip member.

16. The meeting speaker box for a mobile terminal according to claim 13, wherein the rotary shaft is disposed on the second flip member, the rotary hole is disposed on the first flip member, the damping assembly comprises a damping ring and a damping sheet, the damping ring is provided with a plurality of elastic protrusions along a circumferential direction of the damping ring, a plurality of concavities are formed between the plurality of elastic protrusions, a caught portion protrudes from the damping sheet, the damping ring is secured to the rotary shaft, the damping sheet is secured to the first flip member, and when the second flip member rotates relative to the first flip member, the caught portion is allowed to be caught in one of the concavities.

17. The meeting speaker box for a mobile terminal according to claim 16, wherein the damping ring comprises a stopper and an elastic ring, a section of the elastic ring is wave-shaped, each of the concavities is located between respective two adjacent waves of the elastic ring, the stopper is disposed at one end of the elastic ring, and the stopper abuts against of an end of the rotary shaft.

18. The meeting speaker box for a mobile terminal according to claim 17, wherein the stopper is provided with a positioning hole, the end of the rotary shaft is provided with a positioning member, and the positioning member extends through the positioning hole.

19. The meeting speaker box for a mobile terminal according to claim 17, wherein the stopper and the elastic ring are integrally formed.

20. The meeting speaker box for a mobile terminal according to claim 17, wherein the damping ring and the rotary shaft are adhered to each other or welded to each other; and/or the damping sheet and the first flip member are adhered to each other or welded to each other.

21. The meeting speaker box for a mobile terminal according to claim 13, wherein the rotary shaft is provided with a through hole along an axial direction of the rotary shaft, a cable connecting the connector is partly located in the first flip member, and the cable passes through the through hole and is partly located in the second flip member.

22. The meeting speaker box for a mobile terminal according to claim 1, wherein a casing connection portion protrudes from the casing, a second bypass portion is recessed in one end of the second flip member, the casing connection portion is located in the second bypass portion, and two sides of the casing connection portion are rotatably connected to two sides of the second bypass portion in a one-to-one manner; and/or a second connection portion protrudes from another end of the second flip member, a first bypass portion is disposed at one end of the first flip member, the second connection portion is located in the first bypass portion, and two sides of the second connection portion are rotatably connected to two sides of the first bypass portion in a one-to-one manner.

23. The meeting speaker box for a mobile terminal according to claim 22, wherein an end of the casing facing the second flip member and an end of the casing connection portion facing the second bypass portion are each provided with an arc surface; and/or two ends of the second flip member, a bottom of the second bypass portion, and an end of the second connection portion facing the first flip member are each provided with an arc surface; and/or an end of the first flip member facing the second flip member is provided with an arc surface.

24. The meeting speaker box for a mobile terminal according to claim 1, wherein the casing comprises a front buffer configured to contact the screen of the mobile terminal; and/or the casing comprises a back buffer configured to contact the back of the mobile terminal.

\* \* \* \* \*